US010368672B2

(12) United States Patent
Masanek, Jr. et al.

(10) Patent No.: US 10,368,672 B2
(45) Date of Patent: Aug. 6, 2019

(54) COASTER

(71) Applicant: MACNEIL IP LLC, Bolingbrook, IL (US)

(72) Inventors: Frederick W. Masanek, Jr., Barrington, IL (US); David F. MacNeil, Fort Lauderdale, FL (US)

(73) Assignee: MacNeil IP LLC, Bolingbrook, IL (US)

( * ) Notice: Subject to any disclaimer, the term of this patent is extended or adjusted under 35 U.S.C. 154(b) by 2 days.

(21) Appl. No.: 15/633,188

(22) Filed: Jun. 26, 2017

(65) Prior Publication Data
US 2018/0368601 A1    Dec. 27, 2018

(51) Int. Cl.
*A47G 23/03* (2006.01)
*B29C 45/00* (2006.01)
*B29K 21/00* (2006.01)
*B29L 31/00* (2006.01)

(52) U.S. Cl.
CPC .......... *A47G 23/03* (2013.01); *B29C 45/0001* (2013.01); *B29K 2021/003* (2013.01); *B29K 2021/006* (2013.01); *B29L 2031/7728* (2013.01)

(58) Field of Classification Search
CPC ................................. B65D 11/22; B65D 11/24
USPC .... 248/687, 688, 633, 188.8, 188.9, 346.01, 248/346.11; 220/608, 628
See application file for complete search history.

(56) References Cited

U.S. PATENT DOCUMENTS

| D132,808 | S | 11/1872 | Currier |
| D27,891 | S | 11/1897 | Miner |
| D46,005 | S | 6/1914 | Palmer |
| 1,600,055 | A | 9/1926 | Meyer |
| 1,981,627 | A * | 11/1934 | Merriman ............... A47G 23/03 206/509 |
| D135,773 | S | 6/1943 | Curran |
| 2,601,312 | A * | 6/1952 | McGrew ................. A47G 23/03 248/346.11 |
| 2,727,645 | A * | 12/1955 | Dore ....................... A47G 23/03 215/393 |
| 2,782,948 | A * | 2/1957 | Meyer .................... A47G 23/03 215/393 |

(Continued)

*Primary Examiner* — Terrell L McKinnon
*Assistant Examiner* — Michael McDuffie
(74) *Attorney, Agent, or Firm* — Perkins IP Law Group LLC; Jefferson Perkins

(57) ABSTRACT

Spaced-apart elongate ribs formed on a floor of an upper surface of a coaster have sidewalls that each have a concave curved surface extending upward from the floor, and a convex curved surface extending upward from an upper end of the concave curved surface to a top of the rib. A radius of the concave curved surface is larger than a height of the rib. A lower surface of the coaster has spaced-apart nibs having surfaces formed as surfaces of rotation, each of which downwardly extends from a general lower surface of the coaster body to a bottom of the nib. A sidewall of the nib has a concave curved surface that extends downwardly from the general surface, and a convex curved surface that extends downwardly from a lower end of the concave curved surface to the bottom of the nib. A radius of the concaved curved surface of the nib sidewall is greater than a height of the nib. The avoidance of crevasses, corners and channels in the coaster makes the coaster easier to keep clean.

12 Claims, 3 Drawing Sheets

(56) References Cited

U.S. PATENT DOCUMENTS

| | | | | |
|---|---|---|---|---|
| 2,893,163 A * | 7/1959 | Hazel, Jr. | | A47G 23/03 248/346.11 |
| 3,120,077 A * | 2/1964 | Stoffel | | A47G 23/03 248/346.11 |
| D204,072 S | 3/1966 | Posmanter | | |
| 3,268,198 A * | 8/1966 | Sweet | | A47G 23/03 248/346.11 |
| 3,848,795 A * | 11/1974 | Bird | | B65D 11/02 220/617 |
| 3,929,312 A * | 12/1975 | Uke | | B63C 11/22 248/346.11 |
| 4,020,592 A | 5/1977 | Saunders | | |
| 4,349,124 A * | 9/1982 | Faller | | B65D 1/44 220/608 |
| 4,833,823 A * | 5/1989 | Edwards, III | | A01G 9/04 108/53.3 |
| 4,865,219 A * | 9/1989 | Logan | | A47G 19/08 206/557 |
| 5,209,013 A * | 5/1993 | Sellers | | A01G 9/04 248/346.11 |
| 5,321,909 A * | 6/1994 | Loran | | A01G 9/04 47/39 |
| 5,353,926 A * | 10/1994 | Yeh | | A47G 23/03 206/217 |
| D361,308 S * | 8/1995 | Loran | | D11/164 |
| D383,377 S | 9/1997 | Sellers | | |
| D391,449 S | 3/1998 | Toth | | |
| 5,743,506 A * | 4/1998 | Adams | | A47B 91/00 248/346.11 |
| D422,119 S | 3/2000 | Austin | | |
| 6,102,352 A * | 8/2000 | Kvalvog | | A47G 23/03 248/346.11 |
| 6,199,715 B1 * | 3/2001 | Hayes | | A47J 36/022 206/564 |
| D439,805 S | 4/2001 | Krohn | | |
| 6,293,422 B1 * | 9/2001 | Jentzsch | | B65D 7/04 220/606 |
| D598,714 S | 8/2009 | Aagaard | | |
| 9,775,455 B2 * | 10/2017 | Weissbart | | A47G 23/03 |
| 2001/0029874 A1 * | 10/2001 | Muirhead | | B65D 19/0012 108/57.25 |
| 2013/0082065 A1 * | 4/2013 | Danabalan | | C03B 40/02 220/602 |
| 2015/0028041 A1 * | 1/2015 | Wurster | | B65D 1/0284 220/608 |
| 2015/0034660 A1 * | 2/2015 | Barel | | B65D 1/0284 220/608 |
| 2015/0191275 A1 * | 7/2015 | Linares | | B65D 19/004 108/57.29 |

\* cited by examiner

COASTER

BACKGROUND OF THE INVENTION

Containers of cooled beverages form surfaces on which airborne moisture condenses. The condensate drips down the sides of the container (such as a glass containing an iced beverage) and onto the surface that is supporting the container. Where that surface is wood, damage can result. Where that surface is glass, plastic or metal, the condensate will collect, pool and spread, oftentimes wetting nearby items such as paper napkins, making the supporting surface slippery, and in general creating a mess.

To meet this problem, coasters have long been known in the art. A coaster typically is flat (although in some designs, there is an appreciable sidewall) and can be constructed of stone, rubber, glass, wood, plastic, metal or cardboard, or composites of these. Many coasters are round and sized to fit the bottom of a glass or drink container; others have been provided that are polyhedral or irregular in outline. It is further known to create a reservoir in the coaster for condensate, by constructing ribs or bumps to stand up from a coaster floor, such that the bottom of the beverage container is supported above the coaster floor. It is also known to support a coaster main body off of a supporting surface (such as a table) by legs or bumps, so as to create an air gap underneath the coaster and increase its insulative effect.

A coaster may also be used to protect the supporting surface from the bottom of a sharp or abrasive object. Some coasters have been proposed that have the effect of increasing the coefficient of friction between the item supported and the supporting surface; these typically are molded of an elastomer and have upstanding and/or depending features with sharp edges.

While it is known to mold or affix bumps or ribs into or onto the upper and/or lower surface of the main coaster body, doing so creates corners, crevasses or channels in which (wet) dirt or other contaminants may accumulate and which are difficult to clean. A need therefore persists for a friction-enhancing coaster that presents a moisture-impermeable barrier, is furnished with a condensate reservoir, and creates an insulative air gap, but nonetheless is easy to keep clean.

SUMMARY OF THE INVENTION

According to one aspect of the invention, a coaster is provided that has an upper surface and an opposed lower surface. The upper surface includes a floor and, standing up from the floor, a plurality of elongate spaced-apart ribs. Each rib has a top that is upwardly spaced from the floor by a predetermined height. The rib has first and second sidewalls that each extend from the floor to the top of the rib. Each sidewall has a concave curved surface extending from the floor to an upper end of the concave curved surface. A convex curved surface of the sidewall extends from the upper end of the concave curved surface to the top of the rib. A radius of the concave curved surface of each of the first and second sidewalls is greater than the height of the rib.

A radius of the convex curved surface of each rib may be on the same order of magnitude as the height of the rib. The top of the rib may be flat and parallel to the coaster floor.

The coaster body may have an axis and the ribs may be distributed around the axis on respective radii from the axis. As so arranged, each of the ribs has a near end and a far end radially spaced from the near end. A spacing between the near end of any one rib and a near end of a next adjacent rib is greater than the radius of the concave curved surfaces of the first and second sidewalls of the rib.

Each rib may have a first end and a second end spaced from the first end by a respective direction of elongation. A first end sidewall may join the first sidewall of the rib to the second sidewall of the rib. Similarly, and at the second end of the rib, the first sidewall of the rib may be joined to the second sidewall of the rib by a second end sidewall. Each end sidewall includes a concave curved surface that extends from the upper surface floor to an upper end of the concave curved surface, and a convex curved surface that extends from the upper end of the concave curved surface to the top of the rib. The radius of the concave curved surfaces of the end sidewalls is greater than the height of the rib. A radius of the convex curved surfaces of the end sidewalls may be of the same order of magnitude as the height of the rib.

The coaster floor may be surrounded by an upstanding lip. A height of the upstanding lip relative to the floor may be greater than the rib height. An inner surface of the lip may make a smooth concavely curved transition with the floor. A radius of this curved transition may be on the same order of magnitude as the height of the lip.

In another aspect of the invention, a lower surface of a coaster body may include a general, flat, horizontal surface and, downwardly depending from this general surface, a plurality of spaced-apart nibs. A surface of each of the nibs may be formed as a surface of rotation around a respective axis. Each nib has a bottom and a sidewall that smoothly joins the general surface to the nib bottom. A concave curved surface of the nib sidewall extends from the general surface to a lower end of the concave curved surface. A convex curved surface of the nib sidewall extends from the lower end of the concave curved surface to the bottom of the nib. A radius of the concave curved surface is greater than the height of the nib, i.e., the distance by which the bottom of the nib is downwardly displaced from the general lower surface.

A radius of the convex surface of each nib sidewall may be of the same order of magnitude as the height of the nib. The spacing of one nib from its nearest neighbor may be greater than the radius of the concave surface of the nib sidewall. The bottom of each nib may be flat and parallel to the general bottom surface of the body.

In a further aspect of the invention, a coaster according to the invention may have both ribs on its upper surface, as above described, and nibs on its lower surface, as above described. Each of the above described embodiments may be formed of an elastomer such as a thermoplastic elastomer (TPE) or a silicone-based thermoplastic vulcanizate (TPV). Alternatively, the coaster may be formed of liquid silicone rubber (LSR) or another thermosetting elastomer such as natural rubber.

Coasters according to the present invention have ribs and/or nibs whose sidewalls make smooth transitions to the general upper or lower surfaces on which they are disposed. The coasters therefore lack corners, crevasses or channels in which dirt, spilled fluid or detritus could otherwise accumulate. This makes the coasters more sanitary and easier to clean. At the same time, coasters according to embodiments of the present invention provide a reservoir for condensate, provide insulative air gaps between the general bottom surface of the coaster and the supporting surface and possibly between the coaster floor and the vessel or object being supported, and may enhance frictional forces between the supported object and the surface supporting the coaster.

BRIEF DESCRIPTION OF THE DRAWINGS

Further aspects of the invention and their advantages can be discerned in the following detailed description as read in conjunction with the drawings of exemplary embodiments, in which like characters denote like parts and in which.

DETAILED DESCRIPTION

Figure 1:
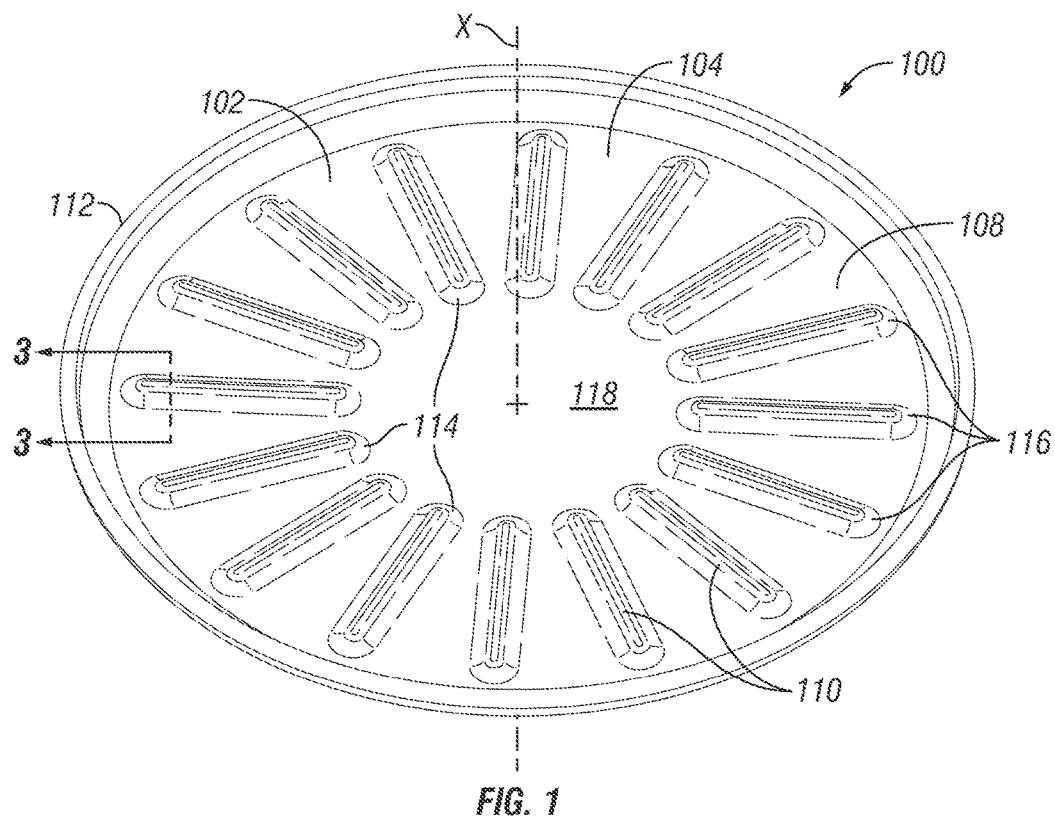
FIG. 1 is a top perspective view of one embodiment of a coaster according to the invention.
Figure 2:
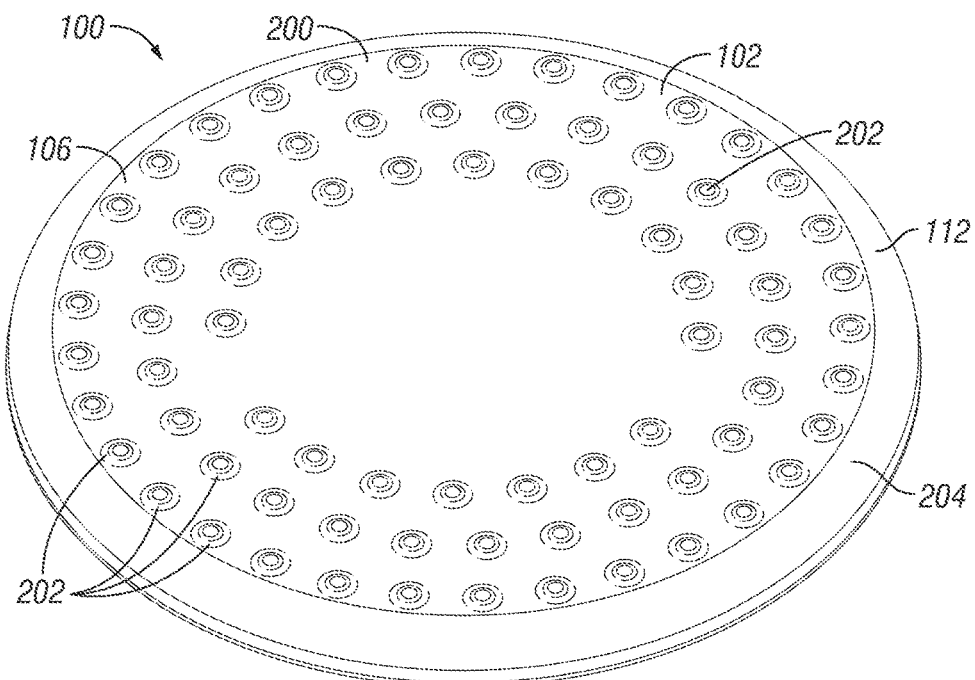
FIG. 2 is a bottom perspective view of the coaster shown in FIG. 1.

One embodiment of a coaster according to the invention is shown in opposing perspective views in FIGS. 1 and 2. A coaster indicated generally at 100 has a body 102 that may be formed as by injection molding from a suitable polymer. The polymer may be an elastomer and may be fluid-impermeable. More particularly, the polymer may be a natural or other thermosetting rubber, an organic thermoplastic elastomer (TPE) or, if a higher temperature resistance is wanted, a silicone-based thermoplastic vulcanizate (TPV) or a thermosetting liquid silicone rubber (LSR). The use of a silicone-based polymer may be indicated where the coaster 100 is to be used as a trivet for a hot cooking utensil, e. g. The body 102 has a generally flat aspect and, in the illustrated embodiment, is round. The body 102 may be formed around a vertical axis X. In other embodiments, the body 102 may be polyhedral or could take any other desired shape.

The body 102 has an upper surface 104 and, in opposition to it, a lower surface 106 (FIG. 2). The upper surface 104 may have three components: a general upper surface or floor 108, a plurality of spaced-apart, elongate ribs 110 that stand up from the floor 108, and a peripheral lip 112 that also stands up from the floor 108. The ribs 110 may be arranged on respective radii relative to axis X and may be regularly angularly spaced from each other. In the illustrated embodiment, the ribs 110 are of uniform length, height and width.

Each rib 110 has a near end 114 located closer to axis X and a far or remote end 116 spaced from near end 114 and located farther away from axis X. In the illustrated embodiment, the near ends 114 are all on a single circular locus around axis X and the far ends 116 are on another circular locus at a greater radius from coaster axis X. In the illustrated embodiment, a central area 118 of floor 108 is left free, so as to maximize the volume of the condensate reservoir created by floor 108, lip 112 and ribs 110. In the illustrated embodiment, the far ends 116 are inwardly spaced from peripheral lip 112. The ribs 110 are elongate so that the cylindrical feet of glasses or other beverage containers will be supported by most or all of the ribs 110, as long as the cylindrical foot (not shown) of the glass or container has a radius that falls within a predetermined range. In this way, the glass or container will be supported in such a way that it will remain vertical, and its foot will not tip into the coaster reservoir.

The coaster 100 may come in various sizes. For example, one such coaster 100 may have a four inch overall diameter and may be designed to receive a typical beverage glass or coffee mug. The coaster 100 may also be provided in six inch, eight inch, ten inch, twelve inch or larger or smaller sizes, depending on the diameter of the vessel or other object the coaster is meant to support. A larger size coaster 100 may be used to support a flower pot or a cylindrical water cooler, for example.

As shown in FIG. 2, the lower surface 106 includes two components: a general flat surface 200 and, downwardly depending from the general surface 200 (but upstanding in this bottom view), a plurality of spaced-part nibs 202. The nibs 202 may be formed so as to be round, that is, each of the nibs 202 will present a surface of rotation around a respective axis orthogonal to the plane occupied by general surface 200. The nibs 202 may be arranged in concentric rings on surface 200 or in other suitable arrangements. The nibs may be uniform in size, height and spacing from their nearest neighbors. An outer or lower surface 204 of the peripheral lip 112 is convex and makes a smooth transition to the coaster general lower surface 200.

Figure 3:
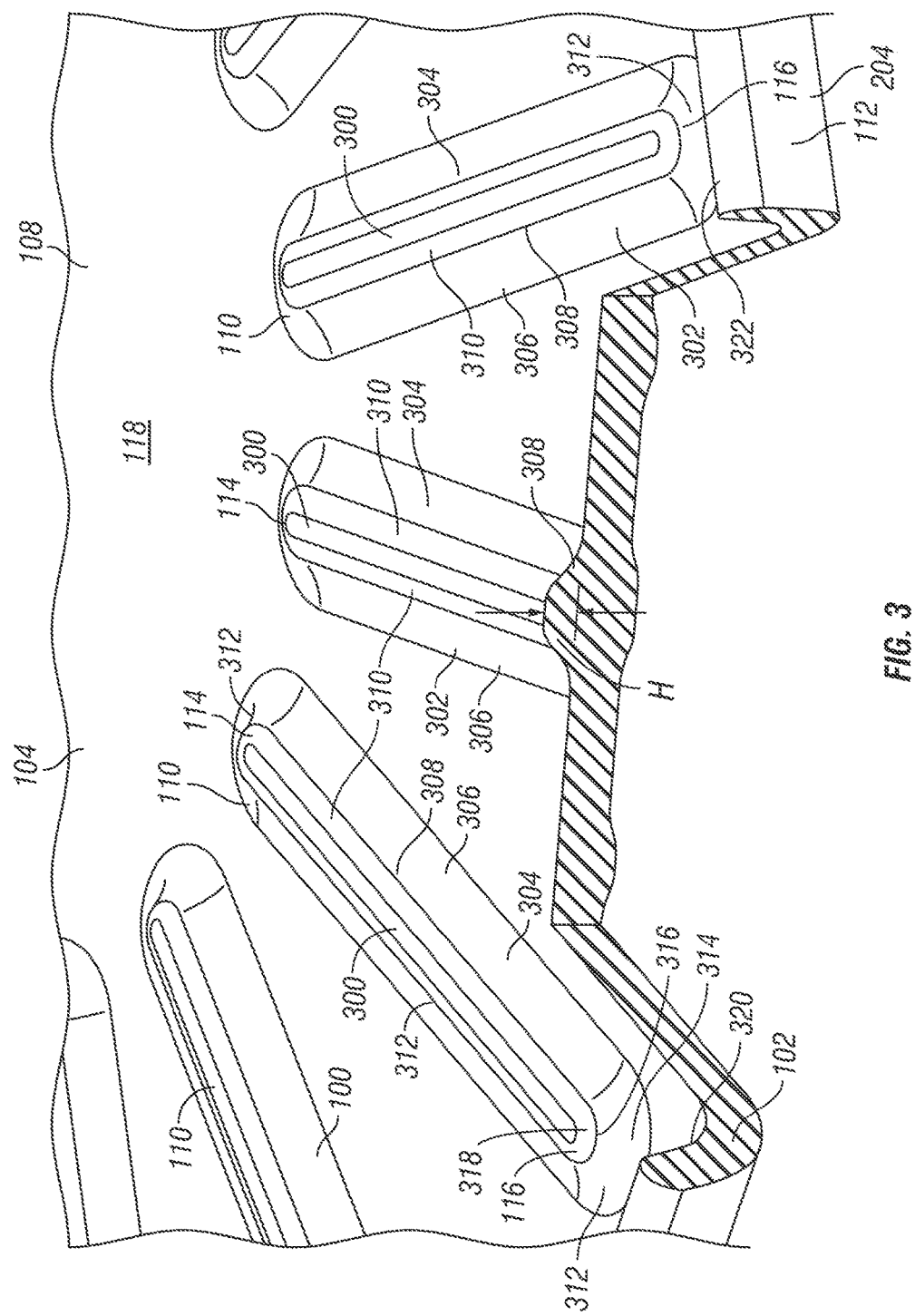
FIG. 3 is a magnified part-top-perspective, part-sectional detail taken substantially along Line 3-3 of FIG. 1.

FIG. 3 is a magnified detail of the upper coaster surface 104 of the embodiment shown in FIGS. 1 and 2. Each rib 110 has a top 300 that in the illustrated embodiment is flat and is parallel to the coaster floor 108. Each rib 110 has a first elongate sidewall 302 and, in opposition to and parallel to the first sidewall 302, a second elongate sidewall 304. The sidewalls 302, 304 do not make abrupt transitions to the tops 300 or to the coaster floor 108 but rather are smoothly continuous with both. Each sidewall 302, 304 has a first, concave curved surface 306 that begins at the floor 108 and ends at an upper end 308 of the concave curved surface 306. Each sidewall 302, 304 further has a second, convex curved surface 310 that begins at the upper end 308 of the concave curved surface 306 and terminates at the top 300. Convex surface 310 is smoothly continuous with concave surface 306.

The radii of the curved surfaces 306 and 310 are of the same order of magnitude as the height H of top 300 above the coaster floor 108. More particularly, the radius of concave curved surface 306 can be chosen to be greater than the height H. The radius of convex curved radius 310 may be about the same as or somewhat less than height H. In one embodiment, rib height H is about 0.050 in., the radius of concave curved surface 306 is about 0.08 in., and the radius of convex curved surface 310 is about 0.03 in.

The ribs 110 are spaced far enough apart from each other that they will not form channels or crevasses in which dirt may be trapped. As arranged in a radial pattern, the spacing apart of the center lines of the near ends 114 of the ribs 110 should be at least twice the radius of the concave curved surfaces 306, and can be about 0.3 in. to about 0.6 in., depending on coaster size.

The near end 114 and the far end 116 of each rib 110 are rounded and their surfaces join, and are smoothly continuous with, the surfaces of elongate sidewalls 302 and 304. Each end 114, 116 has an end sidewall 312 that in transverse section is shaped similarly to the main, elongate rib sidewalls 302 and 304. Each end sidewall 312 has a concave curved surface 314 that has a lower end that is continuous with the coaster floor 108 and an upper end 316. The end sidewall 312 further has a convex curved surface 318 that begins at the upper end 316 of the end sidewall concave curved surface 314 and ends at the rib top 300. End sidewall concave curved surface 314 joins and is smoothly continuous with the elongate sidewall concave curved surfaces 306. End sidewall convex curved surface 318 joins and is smoothly continuous with elongate sidewall convex curved surfaces 310. The radii of the end sidewall concave curved surface 314 and of end sidewall convex curved surface 318 can be chosen to be the same as the respective radii of concave curved surface 306 and convex curved surface 310. In one embodiment, the radius of end sidewall concave curved surface 314 is about 0.08 in. and the radius of end sidewall convex curved surface 318 is about 0.03 in.

The peripheral lip 112 has a height above floor 108 that is substantially higher than rib height H and can be from about 0.175 in. to about 0.250 in., depending on coaster size. An inner surface 320 of the peripheral lip 112 can be a substantially uniform distance away from the outer surface 204 thereof and can have a concavely curved portion where it smoothly transitions to the floor 108. A radius of the concave portion of inner lip surface 320 can be of the same order of magnitude as the lip height, and in one embodiment can be somewhat less than the lip height, such as about 0.125 in. to about 0.165 in. depending on coaster size. Where the radius of the concave portion of inner lip surface 320 is chosen to be less than the lip height, the inner lip surface 320 will also have a frustoconical surface portion located between an upper end of the concavely curved portion and a beginning of a convexly curved portion that in turn extends to a top 322 of the lip 112. A top 322 of the lip 112 can be spaced from each rib far end 116 by a distance that is at least twice the radius of concave curved surface 306.

Figure 4:
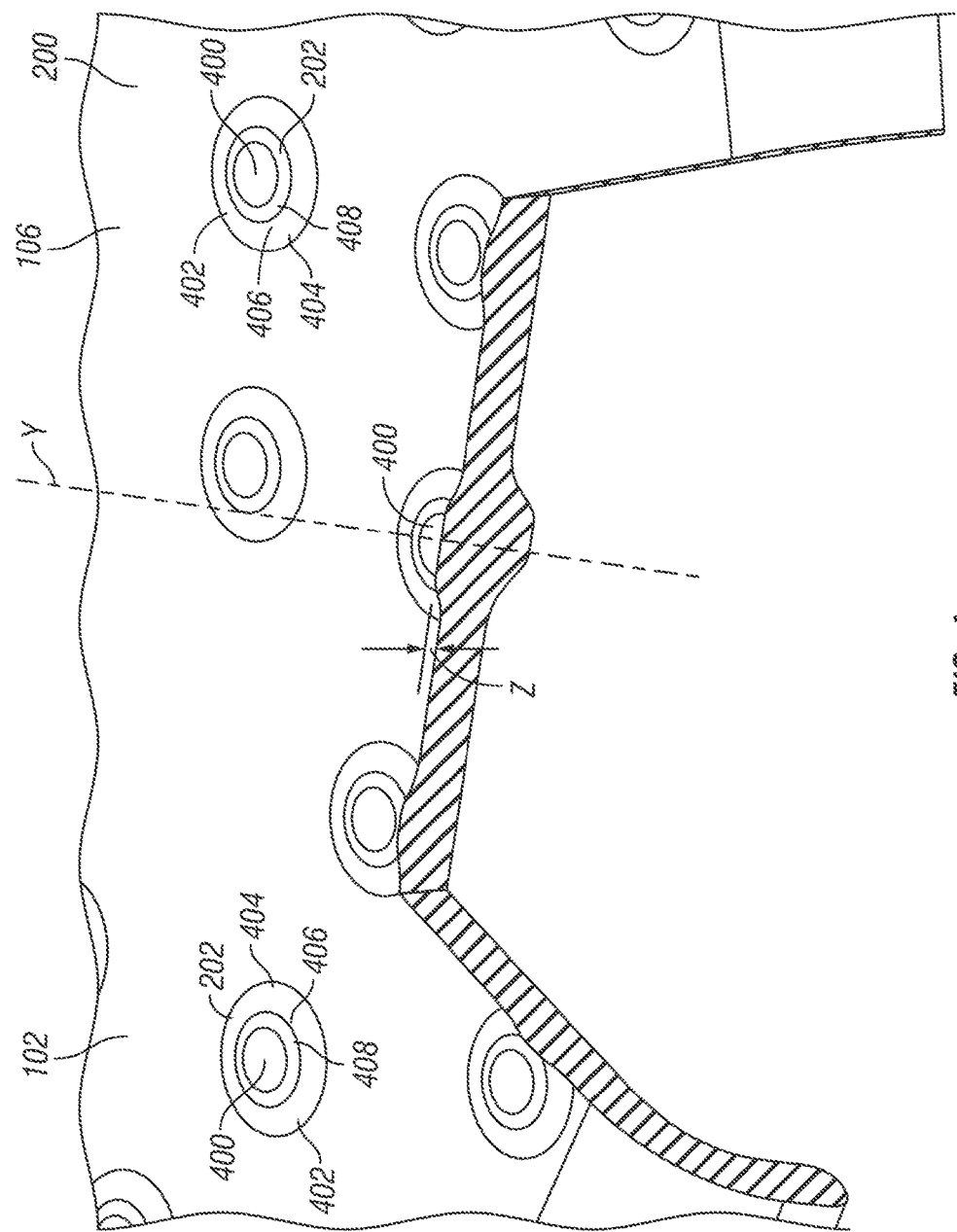
FIG. 4 is a magnified part-bottom-perspective, part-sectional detail taken substantially along Line 3-3 of FIG. 1.

FIG. 4 is a magnified, part-perspective, part-sectional view that uses the same section as the one used in FIG. 3, but taken from a viewpoint below the bottom of the coaster instead of a viewpoint above the top of the coaster. Each nib 202 has a surface that is formed as a surface of rotation around a respective nib axis Y. The axis Y is orthogonal to the general lower surface 200. Each nib 202 has a bottom 400 that is disposed at uniform height Z below (in this bottom view, above) the substantially planar general lower coaster surface 200. An endless nib sidewall 402 joins the lower coaster surface 200 with nib bottom 400 so as to be smoothly continuous with both. The nib sidewall 402 includes a curved surface 404, concave in axial section. An upper end of the concave curved surface 404 is joined to the general surface 200. The concave curved surface 404 extends from general surface 200 to a lower end 406 of the concave curved surface 404. A convex curved surface 408 begins at the lower end 406 of the concave curved surface 404, terminates at nib bottom 400, and is smoothly continuous with both. The nib bottom 400 may be flat and parallel to the general lower surface 200.

The radii (as viewed in axial section) of curved surfaces 404 and 408 are on the same order of magnitude as nib height Z. More particularly, a radius of the concave curved surface 404 may be greater than nib height Z. In one embodiment, nib height Z may be about 0.015 in., the radius of concave curved surface 404 may be about 0.06 in., and the radius of convex curved surface 408 may be about 0.03 in. Each nib 202 may be about 0.09 in. in overall diameter and its axis may be spaced from the axis of the nearest neighbor nib by about 0.30 to about 0.40 in. The lateral spacing of the nib axes away from each other should be at least twice the radius of the concave curved surface 404.

The ribs 110, lip 112 and floor 108 create a reservoir for holding condensate from a cooled article such as a cooled or iced beverage (not shown). The ribs 110 elevate the bottom of the beverage container, etc. out of the condensate. Alternatively, and in conditions where condensation is not likely to form on the beverage container, hot cooking vessel or utensil or the like, the ribs 110 create an air gap that reduces thermal transmission from the supported article to or from the supporting surface. Nibs 202 likewise create and sustain an air gap between the supporting surface and general lower surface 200 that reduces thermal transmission between the supported object (not shown), which may be hotter or colder than ambient, and a supporting surface (not shown).

Because the ribs 110, nibs 202 and peripheral lip 112 all are formed with smoothly continuous surfaces having large radii of curvature, there is no part of the outer surface of coaster 100 that will attract and retain dirt, residue from dried liquid, etc.; there are no sharp corners, crevasses or channels in which dirt may hide. Instead, all external surfaces are accessible by any conventional flexible cleaning element, such as a sponge, cloth or even a human finger, each of which will have no problem conforming to the gently varying surface of the coaster. The coaster 100 is therefore easier to wash and keep clean.

In summary, coasters have been described and illustrated that have ribs and nibs formed by sidewalls having convex and concave surface segments with large radii of curvature. Such coasters permit the inclusion of features such as condensate reservoirs and thermal air gaps, but nonetheless are easy to keep clean.

While embodiments of the present invention have been described and illustrated in the appended drawings, the present invention is not limited thereto but only by the scope and spirit of the appended claims.

We claim:

1. A coaster comprising:
a body having an upper surface and a lower surface opposed to the upper surface;
the upper surface of the body including a floor, a plurality of elongate spaced-part ribs standing up from the floor, a lip of the upper surface of the body standing up from and surrounding the floor;
for each rib, a top of the rib, and first and second sidewalls extending from the floor of the upper surface of the body to the top of the rib, each of the first and second sidewalls including a concave curved surface extending from the floor of the upper surface of the body to an upper end of the concave curved surface, each of the first and second sidewalls further including a convex curved surface extending from the upper end of the concave curved surface to the top of the rib, the floor of the body, the first sidewall of the rib, the top of the rib and the second sidewall of the rib being smoothly continuous;
for each rib, the top of the rib having a height as measured from the floor of the upper surface of the body, a radius of each of the concave curved surfaces of the rib being greater than the height of the rib;
each rib having a respective direction of elongation, a first end, and a second end spaced from the first end in the respective direction of elongation, the first and second sidewalls of each rib extending from the first end of the rib to the second end of the rib, the ends of the ribs being spaced from the lip of the upper surface;
for each rib, the first end of the rib having a first end sidewall that joins the first sidewall of the rib to the second sidewall of the rib, the second end of the rib having a second end sidewall that joins the first sidewall of the rib to the second sidewall of the rib, each of the first and second end sidewalls being a rounded surface that is smoothly continuous with the first sidewall of the rib and the second sidewall of the rib, a concave curved surface of the first end sidewall extending from the floor of the upper surface of the body to an upper end of the concave curved surface of the first end sidewall, a convex curved surface of the first end sidewall extending from the upper end of the concave curved surface of the first end sidewall to the top of the rib, a concave curved surface of the second end sidewall extending from the floor of the upper surface of the body to an upper end of the concave curved surface of the second end sidewall, a convex curved surface of the second end sidewall extending from the upper end of the concave surface of the second end sidewall to the top of the rib, each of the concave curved surfaces of the first end sidewall and the second end sidewall having a radius that is greater than the height of the rib;

the lower surface of the body including a substantially flat, horizontal general surface and a plurality of nibs downwardly extending from the general surface, the nibs being spaced apart from each other;

for each nib, the nib being formed to have a surface of rotation around a respective vertical nib axis, the nib having a bottom vertically spaced from the general surface by a nib height, a nib sidewall downwardly extending from the general surface to the bottom of the nib, a concave curved surface of the nib sidewall extending from the general surface to a lower end of the concave curved surface, a convex curved surface of the nib sidewall extending from the lower end of the nib sidewall concave curved surface to the bottom of the nib, the nib being smoothly continuous in axial section; wherein a radius of the nib sidewall concave surface is greater than the nib height, a radius of the nib sidewall convex surface being of the same order of magnitude as the nib height.

2. The coaster of claim 1, wherein the body is molded from an elastomer.

3. The coaster of claim 1, wherein a radius of the convex curved surfaces of the first and second sidewalls of the rib is of the same order of magnitude as the height of the rib.

4. The coaster of claim 1, wherein the top of each rib is flat and parallel to the floor of the upper surface of the body.

5. The coaster of claim 1, wherein the body has a vertical axis, the ribs spaced from each other around the vertical axis, each rib disposed on a respective radius from the vertical axis.

6. The coaster of claim 5, wherein each rib has a near end disposed near the vertical axis and a far end disposed to be remote from the vertical axis, the near end of each rib being displaced from the vertical axis so as to leave an open central area of the floor.

7. The coaster of claim 6, wherein a spacing of a near end of any rib from a near end of a next adjacent rib is greater than the radius of the concave surfaces of the sidewalls of the rib.

8. The coaster of claim 1, wherein a height of the lip as measured from the floor is greater than the height of the ribs.

9. The coaster of claim 8, wherein the lip has an inwardly facing surface that joins the floor of upper surface of the body in a smooth concavely curved transition, a radius of the concavely curved transition being on the same order of magnitude as the height of the lip.

10. The coaster of claim 1, wherein a radius of each of the convex curved surfaces of the end sidewalls of the rib is on the same order of magnitude as the height of the rib.

11. The coaster of claim 1, wherein, for each nib, the bottom of the nib is flat and parallel to the general surface of the lower surface of the body.

12. The coaster of claim 1, wherein a spacing of each nib from a next adjacent nib is greater than the radius of the nib sidewall concave surface.

* * * * *